United States Patent

Floyd et al.

[11] Patent Number: 6,066,771
[45] Date of Patent: *May 23, 2000

[54] SMELTING OF CARBON-CONTAINING MATERIAL

[75] Inventors: John M Floyd, Upper Beaconsfield; Carl P Jeppe, Shoreham; Robert W Matusewicz, West Footscray; Kenneth R Robilliard, Upwey, all of Australia

[73] Assignee: Ausmelt Limited, Dandenong, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,118

[22] Filed: Apr. 3, 1997

Related U.S. Application Data

[63] Continuation of application No. 08/532,710, filed as application No. PCT/AU94/00159, Apr. 5, 1994, abandoned.

[30] Foreign Application Priority Data

Apr. 6, 1993 [AU] Australia ................................ PL 8167

[51] Int. Cl.⁷ .................................................. A62D 3/00
[52] U.S. Cl. ............................ 588/201; 110/341; 431/2; 423/DIG. 12
[58] Field of Search ................................ 588/1, 201, 205, 588/213, 228; 423/DIG. 12; 75/10.29, 10.3, 10.4, 10.46, 10.59; 110/341; 431/2

[56] References Cited

U.S. PATENT DOCUMENTS

| | | |
|---|---|---|
| 2,647,045 | 7/1953 | Rummel ................................ 48/206 |
| 2,848,473 | 8/1958 | Rummel ................................ 260/449 |
| 2,923,260 | 2/1960 | Rummel ................................ 110/28 |
| 2,953,445 | 9/1960 | Rummel ................................ 48/216 |
| 3,527,178 | 9/1970 | Southwick .............................. 110/8 |
| 3,647,358 | 3/1972 | Greenberg ............................... 23/2 |
| 3,668,120 | 6/1972 | Patterson ............................... 210/60 |
| 3,706,549 | 12/1972 | Knuppel ................................ 75/60 |
| 3,744,438 | 7/1973 | Southwick ............................ 110/8 E |
| 3,812,620 | 5/1974 | Titus ..................................... 48/65 |
| 3,845,190 | 10/1974 | Yosim . | 
| 3,890,908 | 6/1975 | Von Klenck ........................... 110/8 R |
| 3,974,784 | 8/1976 | Greenberg ............................. 110/8 R |
| 4,017,271 | 4/1977 | Barclay ................................ 48/197 R |
| 4,043,766 | 8/1977 | Gernhardt .............................. 48/73 |
| 4,140,066 | 2/1979 | Rathjen ................................ 110/235 |

(List continued on next page.)

FOREIGN PATENT DOCUMENTS

| | | |
|---|---|---|
| 1678788 | 12/1988 | Australia . |
| 7933291 | 6/1991 | Australia . |
| 0550136 | 7/1973 | European Pat. Off. . |
| 0085153 | 8/1983 | European Pat. Off. . |
| 0294300 | 12/1988 | European Pat. Off. . |
| 0465388 | 1/1992 | France . |
| 2719284 | 11/1977 | Germany . |

(List continued on next page.)

OTHER PUBLICATIONS

Slag Atlas, Dusseldorf, Verlag Stahleisen M.B.H., 1981, pp. 194, 195 and 199.
Rosenquist, T., Principles of Extractive Metallurgy, McGraw–Hill, 1974, pp. 340–341.
Database WPI, Section CH, Week 8622, Derwent Publications Ltd., London, GB; Class M24, AN 86–143075 X P002022173 & SU–A–1 189 883 (Zhdanov Metal Inst), Nov. 7, 1985 Abstract.

*Primary Examiner*—Ngoclan Mai
*Attorney, Agent, or Firm*—Ladas & Parry

[57] ABSTRACT

A process for treating carbon-containing material contaminated with toxic elements utilises smelting of the material in a top-submerged lancing reactor. The material has its carbon content present as elemental or free carbon. Smelting is conducted so as to form, or in the presence of, a fluid slag. In the course of smelting, free-oxygen-containing gas is injected into the slag by top-submerged injection, to combust the carbon content of the material. Volatilizable toxic elements are discharged in reactor off-gas, while non-volatilizable elements are substantially fully incorporated into the slag.

17 Claims, 2 Drawing Sheets

U.S. PATENT DOCUMENTS

| | | | |
|---|---|---|---|
| 4,145,396 | 3/1979 | Grantham | 423/22 |
| 4,187,672 | 2/1980 | Kasor | 60/39.12 |
| 4,230,053 | 10/1980 | Deardorff | 110/346 |
| 4,244,180 | 1/1981 | Rasor | 60/39.04 |
| 4,246,253 | 1/1981 | Grantham | 423/659 |
| 4,346,661 | 8/1982 | Nakamura | 110/259 |
| 4,388,084 | 6/1983 | Okane | 48/197 |
| 4,389,246 | 6/1983 | Okamura | 75/60 |
| 4,400,936 | 8/1983 | Evans | 60/274 |
| 4,402,274 | 9/1983 | Meenan | 110/346 |
| 4,431,612 | 2/1984 | Bell | 422/186.21 |
| 4,432,344 | 2/1984 | Bennington | 126/438 |
| 4,447,262 | 5/1984 | Gay | 75/65 R |
| 4,481,891 | 11/1984 | Takeshita | 110/238 |
| 4,574,714 | 3/1986 | Bach | 110/346 |
| 4,602,574 | 7/1986 | Bach | 110/346 |
| 4,735,784 | 4/1988 | Davis | 423/111 |
| 4,763,585 | 8/1988 | Williams et al. | 110/346 |
| 5,000,101 | 3/1991 | Wagner | 110/346 |
| 5,177,304 | 1/1993 | Nagel | 588/201 |
| 5,191,154 | 3/1993 | Nagel | 588/201 |
| 5,251,879 | 10/1993 | Floyd | 266/44 |
| 5,271,341 | 12/1993 | Wagner | 110/346 |
| 5,277,846 | 1/1994 | Tanari | . |
| 5,282,881 | 2/1994 | Baldock | 75/500 |
| 5,298,233 | 3/1994 | Nagel | 423/580.1 |
| 5,301,620 | 4/1994 | Nagel | 110/346 |
| 5,304,701 | 4/1994 | Igarashi | 588/201 |
| 5,308,043 | 5/1994 | Floyd | 266/78 |
| 5,322,547 | 6/1994 | Nagel | 75/414 |
| 5,395,405 | 3/1995 | Nagel | 48/197 R |
| 5,396,850 | 3/1995 | Conochie | 110/346 |
| 5,449,505 | 9/1995 | Gay | 423/332 |
| 5,491,279 | 2/1996 | Robert et al. | 588/201 |

FOREIGN PATENT DOCUMENTS

| | | |
|---|---|---|
| 58-73742 | 5/1983 | Japan . |
| 59-27117 | 2/1984 | Japan . |
| 59-28505 | 2/1984 | Japan . |
| 1189883 | 11/1985 | U.S.S.R. . |
| 9108023 | 6/1991 | WIPO . |
| 92/01492 | 2/1992 | WIPO . |
| 93/10862 | 6/1993 | WIPO . |

SMELTING OF CARBON-CONTAINING MATERIAL

This application is a continuation of application Ser. No. 08/532,710 filed on Feb. 7, 1996 now abandoned, which is a 371 of International Application PCT/AU94/00159 filed on Apr. 5, 1994 and which designated the U.S.

This invention relates to a process for processing carbon-containing material contaminated with toxic elements.

The carbon content of the carbon-containing material used in the present invention substantially is present as free or elemental carbon. Thus, the carbon content may substantially comprise graphite in its various forms such as block graphite, or amorphous or microcrystalline graphite such as coke, carbon black and charcoal. However, the carbon-containing material additionally can include carbonaceous material such as bituminous materials heavy oil residues, or the like, particularly where used as a binder for particulate graphitic material.

The invention has particular relevance to contaminated carbon-containing material produced in electrolytic smelting of aluminium, such as spent pot liner (SPL) material, and the following description largely is directed to the processing of SPL material. However it is to be understood that the invention also relates to the processing of contaminated carbon-containing material other than SPL material, whether produced in the electrolytic smelting of aluminium, or in other industries.

Electrolytic reduction cells or pot lines of electrolytic smelters for recovery of aluminium metal are lined with carbonaceous material. Typically the reduction cell lining has an outer, refractory alumino-silicate shell, and an inner carbonaceous shell. During the life of reduction cells, the carbonaceous shell of the lining is gradually destroyed by penetration of materials of the electrolytic bath contained therein, and by ageing under prevailing temperatures. Ultimately, the outer shell also becomes contaminated by bath materials. The operating efficiency of the cells declines as a result of these factors, necessitating replacement of the carbonaceous shell, or of both the inner and outer shells. Removed material of the lining, comprising SPL material, then must either be stock-piled, or processed to provide a residue to be discarded. The processing can result in recovery of some materials, such as fluorine as HF, and some recovered materials can be recycled to the smelting operation or to an antecedent operation. The SPL material can comprise that recovered from the inner, carbonaceous shell ("Cut 1"), that recovered from the outer shell ("Cut 2") or a mixture of Cuts 1 and 2.

U.S. Pat. No. 4,735,784 to Davis et al discusses prior art proposals of U.S. Pat. No. 4,065,551, to Dahl; U.S. Pat. No. 4,113,832, to Bell et al; U.S. Pat. Nos. 4,158,701 and 4,160,809, both to Anderson et al; and U.S. Pat. No. 4,362,701, to Kruger et al. Further prior art proposals are provided in U.S. Pat. No. 4,113,831, to Orth, Jr. et al and U.S. Pat. No. 4,444,740 to Snodgrass et al, although the proposals of the latter two patents are in a distinct context in relating to aqueous leaching operations.

In relation to the prior art considered in U.S. Pat. No. 4,7357,84, Davis et al point out that none of the proposals produces a final waste residue that is rendered inert to health and environmental risks. The proposals provide a particulate residue from which remaining contaminants are able to be leached. Also, the proposals teach directly, or indirectly, a need to avoid conditions resulting in formation of a slag.

Davis et al proposes a method for treating SPL material, in which the material is mixed with silica, and the resultant mixture then heated at an elevated temperature to form a slag. The method necessitates sufficient added silica in the mixture, and forming the slag in the presence of water, to provide pyrohydrolysis conditions which result in volatilization of substantially all fluoride contaminants as HF. Thereafter, the slag is cooled to produce an insoluble silicate glass-residue containing any remaining fluoride contaminants in an immobile state.

In the proposal of Davis et al, heating of the mixture of waste material and silica is to a temperature of 1000° to 1700° C. Where the waste material is SPL material, the major carbon content thereof is combusted to provide at least a portion of the process heat requirement. However, the silica addition is to a level of from 7 to 50% by weight of the waste material, and a resultant disadvantage of the proposal is that the quantity of residue can exceed that of the waste material feed. This disadvantage can apply even with combustion of all of the carbon content of SPL material. Also, the proposal does not enable the fuel value of the carbon content to be efficiently utilised.

While the present invention has particular relevance to the processing of SPL material, it is indicated above that it also can be applied to the processing of other carbon-containing materials. One important example of another suitable material comprises residues from vertical retorts, such as used for distilling zinc from concentrates. Similar materials include waste graphite crucibles used for metallurgical cupellation containing recoverable precious metal values, and activated carbon-containing precious metals and/or toxic metals. In the distillation of zinc from a vertical retort, the concentrates are mixed with coke, and heated in the retort. The distillation leaves a residue containing carbon from unreacted coke, some gangue material from the concentrate, and some zinc residue, typically with some lead and silver.

Another suitable material for which the present invention is applicable comprises waste graphite blocks from nuclear reactors. Such waste graphite blocks, of course, are contaminated by radioactive products and, as a waste material, they present a major problem of either safe storage or disposal.

The present invention provides a process for processing carbon-containing material contaminated with toxic elements, with the process enabling the fuel value of the carbon content to be efficiently utilised. In the case of SPL material contaminated at least by fluoride, in particular, the process obviates the need for added silica although, as indicated herein, silicon can be present in some carbon-containing material to be processed, typically as silicate.

In the process of the invention, the carbon-containing material is smelted in a top-submerged lancing reactor or furnace, utilising top-submerged injection of free-oxygen-containing gas such as air, oxygen or oxygen-enriched air. The smelting is conducted to form, or in the presence of, a fluid slag by addition of a suitable flux material. The oxygen-containing gas is supplied by top-submerged injection into the slag for combustion of the carbon content of the carbon-containing material, with the carbon content thus being utilised as at least part of the fuel requirement for the process. In the course of the smelting SPL material, fluorine-containing contaminants in the carbon-containing material are liberated such as through reactions involving a hydrogen-containing compound, such as water which may be mixed with the SPL feed or water vapour generated from the hydrocarbon content of fuels. Other toxic elements in the carbon-containing material, such as $H_2S$ and HCN are oxidised within the reactor, such as by the oxygen content of the top-blown gas, to produce harmless products such as water vapour, carbon dioxide and nitrogen gas. Sulphur can be either dissolved in the slag or oxidised to $SO_2$ which reports to the flue gas, from which it can be removed in flue-gas scrubbing operations.

In the case of smelting carbon-containing material comprising residue from a vertical retort, contaminants comprising zinc and lead, as well as any precious metals present such as silver, can be fumed and recovered from off-gases from the furnace. To the extent that they are not driven off as fume, zinc and lead report in the slag, but generally at an environmentally acceptable low level.

With carbon-containing material comprising waste graphite blocks from nuclear reactors, the effect of smelting will depend on the radioactive contaminants present. Some such contaminants will be driven off as fume with furnace off-gases, while others will be taken up in the slag. In the case of contaminants present in off-gases, they are able to be recovered from the gases such as by use of a fabric filter baghouse through which the gases are passed. Contaminants reporting in the slag are able to be encapsulated therein as silicates and/or in solution or the like. Radioactive material typically is present in waste graphite blocks at relatively low concentrations, with the quantities recovered from off-gases being small and thus facilitating further processing for their safe containment and storage. Similarly, quantities present in the slag are small, while the volume of slag in which they are recovered is substantially less than that of the waste graphite block feed so that containment or storage again is facilitated.

The process of the invention most preferably is conducted in a single furnace comprising the top-submerged lancing reactor. The process is able to be conducted as a continuous smelting operation. Alternatively, it can be conducted on a semi-continuous basis in which, after a suitable smelting period, the feeding of carbon-containing material is stopped, and mixing and flushing of the slag is continued by top-submerged injection of oxygen-containing gas, for an interval sufficient to achieve final evolution of contaminants with the reactor flue gases.

Where the smelting operation is conducted continuously, slag may be tapped throughout the operation (at least after a sufficient start-up period), or at suitable intervals. While a continuous smelting operation may not result in evolution of contaminants to obtain the very low residual level possible with semi-continuous operation as described above, continuous operation can be adapted to achieve a comparable low level. Thus, in a variant providing continuous smelting operation, the reactor used may have top-submerged lances operable in at least two zones. In that variant there is at least one first zone of the reactor to which the carbon-containing material is fed and in which its carbon-content is combusted by the top-submerged injected oxygen-containing gas; and at least one second zone of the reactor to which there is no feed of the carbon-containing material, and in which mixing and flushing of slag from the first zone is effected by top-submerged injected oxygen-containing gas. In the variant, slag preferably is tapped continuously or at intervals at a location near to a second zone and remote from the or each first zone.

The lance or lances providing top-submerged injection of oxygen-containing gas are positioned to inject the gas in the slag. The lance also will preferably have facilities for discharge of an oxygen-containing gas into the gas space above the bath. This discharge is to ensure complete oxidation, such as by post-combustion, of gases such as carbon monoxide, hydrogen or hydrocarbon gases to produce harmless gases such as carbon dioxide and water vapour.

The carbon-containing material most preferably comprises SPL material. It may comprise SPL material of Cut 1, Cut 2 or of a mixture of Cuts 1 and 2. Additionally, it may include other waste material from aluminium smelter operation, such as carbon-containing spent anode material, spent alumina from smelter off-gas dry scrubbers, channel and trench cleanings, floor sweepings and spent smelter roof material. Where necessary, the waste material is crushed but, in contrast to prior art proposals in general, the crushed material can be relatively coarse. In general, crushing to −20 mm is sufficient.

Some waste material such as floor sweepings, able to be included with SPL material, is relatively fine. Such material can be agglomerated, if required, although the process of the invention does not necessitate this. Coarse material preferably is added to the reactor via an inlet chute in an upper region such as the roof, of the reactor. Fine material in the coarse feed, or added thereto can be partly agglomerated by mixing with water just before entering the furnace. This lightly agglomerated material then enters the bath and reacts. The feed system is provided with facilities to draw any gases produced by the wetting operation into the furnace to ensure that any toxic gases are completely reacted to harmless gases. In another variation, fines are able to be injected, such as with oxygen-containing gas supplied by top-submerged injection into the slag. Loss of fines with reactor off-gases can be avoided in all of these means so that very little dust from the feed material enters the flue gases.

The carbon-containing material, such as SPL material, preferably is fed in a continuous manner to the reactor, although batch-wise or intermittent feed is possible. During the smelting operation, a slag is present. The slag, or an initial quantity of slag, can be present at the outset, or slag can be formed in a start-up phase of the smelting operation. Preferably, slag and/or slag-forming flux is fed to the reactor during smelting. The slag and/or flux most preferably is fed continously, although batch-wise or intermittent feed is possible. Depending on the form of the slag and/or flux, it may be fed via a chute in an upper region of the reactor, such as with the carbon-containing feed material, or through the lance providing top-submerged injection of oxygen.

The slag or slag-forming flux may comprise waste slag from an iron- or steel-making operation or from a nonferrous smelting operation, iron ore, basalt, limestone or similar material. The smelting operation of the process of the invention preferably is conducted at a temperature of from about 1100° C. to about 1400° C. The slag or slag-forming flux most preferably is such as to provide a suitably fluid, liquid slag at such temperature.

The carbon of the carbon-containing feed material to be smelted is combusted in the reactor by the top-submerged injected oxygen-containing gas. Depending on the carbon content of that material, the combustion may provide all of the heat requirements of the process. Where the carbon content is insufficient to meet those requirements, fuel is supplied to the reactor during the smelting operation, either continuously throughout the operation, or intermittently. The fuel may comprise at least one of natural gas, oil or coal. Where the fuel is natural gas, oil or coal fines, it may be blown into the reactor by the lance providing top-submerged injection of oxygen for smelting, or by an adjacent lance. Where the fuel is coal, it may be added to the reactor in a coarse particulate, or lump form through an inlet chute in an upper region of the reactor, such as with the carbon-containing feed material.

Iron oxide may be present in the slag, due to the nature of the slag or slag-forming flux used or as a result of its presence in the carbon-containing material. Where present in the slag, iron oxide can be at a level at which it is beneficial in providing an oxygen-carrier from a location at which oxygen-containing gas is injected into the slag to carbon of carbon-containing material floating in and reaching to the top surface of the slag. At that location, $FeO_{1.5}$ is able to be formed in the slag by the reaction:

$$FeO_{(slag)} + \tfrac{1}{4}O_2 = FeO_{1.5(slag)} \qquad (1)$$

The resultant $FeO_{1.5}$ in the slag then is transferred to the carbon-containing material by turbulence generated by the top-submerged injection of oxygen-containing gas, so as to combust the carbon $C_m$ content of particles of the carbon-containing material, by the reaction:

$$2FeO_{1.5(slag)} + C_m = 2FeO_{(slag)} + CO \qquad (2)$$

The iron oxide in the slag similarly acts as an oxygen-carrier enhancing combustion of fuel, if used. Also, $CO_2$ can also be generated, depending on the relative abundance of carbon as $C_m$ and in fuel.

Carbon monoxide generated by reaction (2) and the corresponding reaction involving the combustion of fuel, if used, preferably is post-combusted in or above the slag. That is, excess air, oxygen or oxygen-enriched air is provided to achieve substantially complete combustion of the carbon monoxide to carbon dioxide. Similarly, hydrogen liberated or generated during smelting, as well as any hydrocarbon gases liberated or generated by reaction involving any water present, also can be post-combusted.

The oxygen required for post-combustion can be provided by the top-submerged injected oxygen-containing gas being injected to provide oxygen in excess of stoichiometric requirements for combustion. Resultant post-combustion can be at least partially within the slag or above the slag, depending on the level within the slag at which the oxygen-containing gas is injected. If required, the top-submerged lance can have a single jetting nozzle, or a plurality of jetting nozzles, and in the latter case oxygen for post-combustion can be injected through at least one nozzle of the lance which is at a divergent angle with respect to at least one nozzle through which oxygen for combustion is injected.

Alternatively, oxygen for post-combustion can be supplied through a lance separate from the lance providing oxygen-containing gas for combustion. The lance supplying post-combustion oxygen may provide for top-blowing, or it may simply blow oxygen laterally into the reactor space above the slag.

In a further alternative, the oxygen for post-combustion is provided by a modified form of top-submerged lance, and issues from a shroud of that lance which terminates above the slag. In this alternative, the shroud is in the form of an annular sleeve mounted around an upper portion of the lance to define, between the shroud and the lance, an annular passageway which is open at its lower end. The supply of oxygen-containing gas to the passageway, at the upper end of the lance, enables the gas to discharge into the reactor space, above the slag, to enable required post-combustion. This arrangement facilitates control over the feed rate of oxygen for post-combustion independently of top-submerged injection of oxygen-containing gas for combustion.

Post-combustion has several benefits in the process of the invention. It enables the release of resultant heat energy to the slag and carbon-containing feed material, to thereby enhance smelting of the feed material. Also, it increases the temperature of the reactor off-gases, increasing the level of heat energy able to be recovered from those gases without the need for a separate combustion stage. Additionally, it results in CO and $H_2$ of the off-gases being burnt substantially completely to harmless carbon dioxide and water vapour.

Where the carbon-containing feed material contains fluorides, as is the case with SPL material, substantially complete removal of fluorine from the reactor is able to be achieved by the smelting operation. The removal of fluorine can be enhanced by conducting the smelting in the presence of a sufficient level of material containing hydrogen compounds which, under the smelting conditions, form HF which is readily evolved with reactor off-gases. Hydrogen containing compounds may be present to a sufficient level in the carbon-containing feed material. However, they additionally or alternatively may be added to the reactor as water, and/or as fuel comprising natural gas, oil or coal, with volatiles in the coal providing such compounds. However, other organic materials can be used, if required.

Slag resulting from the smelting operation, and tapped from the reactor, can be disposed of or recycled. Where the slag is to be disposed, it can be cast, but preferably is granulated in a water stream or tank. The slag can be used as landfill or, where appropriate, it can be used in building material production. The level of contaminants remaining in the slag typically is very low and complies with standards set by environmental agencies for landfill, while the contaminants are substantially unleachable from the slag by groundwater or the like.

While relatively coarse crushing of carbon-containing feed material to −20 mm generally is sufficient, fines inevitably will be produced. Also, in the case of aluminium smelter waste able to be smelted with SPL material, it will be appreciated that spent alumina from dry scrubbers and floor sweepings, for example, will substantially comprise fines. As indicated above, fines can be injected through a top-submerged lance. However, fines feed material preferably is fed to the reactor with sufficient water, or other suitable binder, to produce a pugged material. This lightly agglomerated, pugged material can be fed to the reactor through a chute in an upper region of the reactor, to drop into the slag. The feeding of fines as pugged material minimises loss of fines from the reactor as dust carried out through the reactor flue line and, with good practice, less than 1% of the fine feed is lost.

Water, or an organic or inorganic binder, used to provide pugged fines can provide the hydrogen compound which facilitates removal of fluorine where, for example, the carbon-containing material comprises SPL material. However this water, or water added separately or with carbon-containing material in a moistened or damp condition, also can be used more generally to maintain a required heat energy balance in the smelting operation. Thus, where the fuel value of the carbon and organics content of the carbon-containing material exceeds the heat requirements of the smelting operation, the water can be used to maintain the heat balance by taking up heat energy by volatilization. If required, water for this purpose can be injected as required, through the or a top-submerged lance or through a separate pipe.

The slag used or resulting from the process of the invention can have a significant solubility for all components of commercially available refractory containment materials. Thus, the life of refractories in the reactor may be limited, particularly at temperatures in excess of the preferred upper limit of about 1250° C. The reactor therefore preferably is provided with water-cooling facilities, such as by forming the reactor with a double-walled outer metal shell through which coolant water is circulated. In an alternative arrangement, the reactor has a single-walled outer metal shell, and supply means located exteriorly of the shell for spraying coolant water against the outer surface of the shell. In each case, cooling is provided at least at high-wear areas of the reactor. The cooling of the reactor by circulated or sprayed coolant water preferably is such as to form a lining of solidified slag around the inner, refractory-lined periphery of the reactor, to thereby protect the refractory from molten slag. Water cooling adds to initial capital cost, while it also can add to operating costs due to increased heat losses from the smelting operation. However, the added costs need to be balanced by lower maintenance costs and increased reactor availability due to less frequent refractory replacement intervals. Also, the added operating costs are not significant where the carbon-containing feed material has sufficient fuel value to avoid the need for fuel addition. The composition of the slag produced is adjusted by suitable fluxing to ensure the protective lining of solid slag is obtained at the temperature of operation.

BRIEF DESCRIPTION OF THE DRAWINGS

Reference now is directed to the accompanying drawings, in which.

Figure 1:
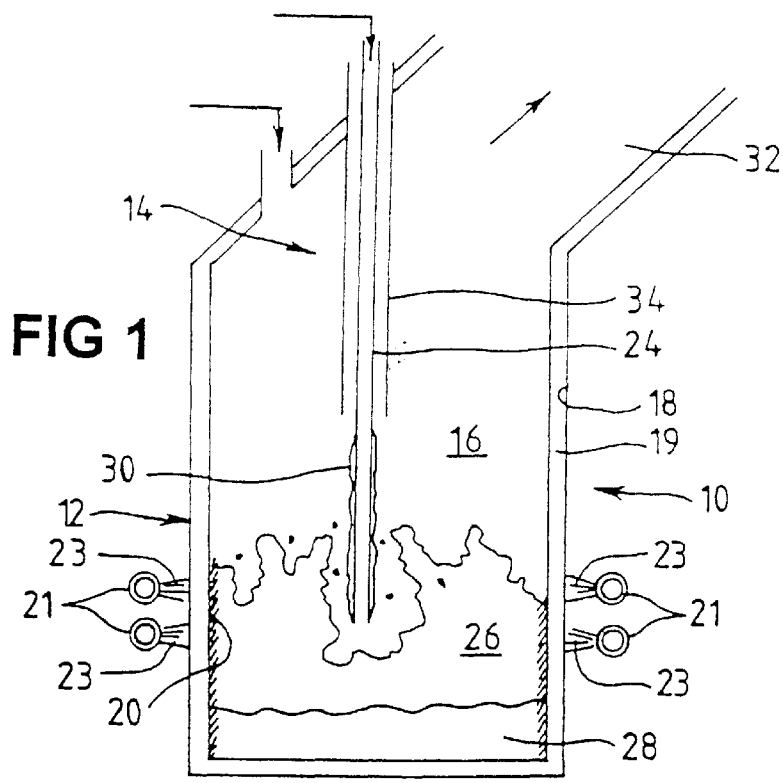
FIG. 1 is a schematic representation of a reactor system for use in the process of the present invention.

The reactor system 10 of FIG. 1 has a furnace reactor 12 in which SPL or similar or other carbon-containing material is lable to be smelted, and a top-submerged lance 14 inserted through the roof of reactor 12. A reactor chamber 16, in which smelting of the SPL material is conducted, is defined by reactor 12. Chamber 16 is defined within an outer shell 18 of steel and, internally of shell 18, by a lining of suitable refractory material 19. At least around its lower extent in which charged material and slag is present during smelting, reactor 12 is adapted for the spraying of coolant water onto the external surface of shell 18. This is illustrated by annular water supply conduits 21 which encircle reactor 12 and are provided with nozzles for generating water jets 23. The spraying of water is such that resultant cooling of shell 18, and adjacent refractory material 19, causes a protective skin 20 of solidified slag to be formed; skin 20 protecting material 19 from dissolution by molten slag.

Carbon-containing material in particulate form, such as SPL material, typically −20 mm, is fed to chamber 16 via inlet chute 22 in an upper region of reactor 12. Flux material for slag forming also is charged through chute 22. While not shown, chute 22 typically will be provided with appropriate gating means which obviates loss of reactor gases through chute 22.

Lance 14 has a main conduit means 24 through which top-blown oxygen-containing gas is supplied by top-submerged injection into chamber 16. Conduit means may comprise a single conduit for that gas, with fumes of the carbon-containing material and solid fuel fines being entrained in the gas. Alternatively, conduit means 24 may comprise at least two concentric conduits, with the gas injected through one of these, with entrained fines of carbon-containing material if required, and gaseous or liquid fuel injected through another of the conduits.

In start-up of a smelting operation, lance 24 is lowered in chamber 16 to an intermediate height, with oxygen-containing gas being blown to generate a sufficient depth of molten slag 26 to which the carbon-containing material 28 is added. The intermediate height is such as to cause splashing of the slag so that slag splashes and is solidified on a lower extent of conduit means 24. When a sufficient coating 30 of protective slag has been formed on means 24, lance 14 then is lowered so that its lower tip-end is in the slag to provide top-submerged, direct injection of the oxygen-containing gas into the slag.

During smelting, the carbon content of the carbon-containing material, such as SPL material, and injected fuel is substantially fully combusted, generating $CO_2$ and $H_2$ as reactor off-gases which pass or are drawn from chamber 16 via flue-offtake 32 of reactor 12. The combustion liberates fluoride contaminants of the SPL material as HF which is evolved with other off-gases.

In addition to conduit means 24, lance 14 has a concentric shroud 34 which is open at its lower end. As shown, the axial extent of shroud 34 from the upper end of lance 14 is such that, with conduit 24 lowered for top-submerged injection, the lower end of shroud 34 is spaced above slag 26. Oxygen-containing gas is blown through the annular passage defined between shroud 34 and conduit means 24, and is discharged into chamber 16 above slag 26 through the open lower end of that passage. The oxygen content of the gas blown through shroud 34 effects post-combustion of CO and $H_2$ to $CO_2$ and $H_2O$ in chamber 16, with a substantial proportion of the heat energy resulting from post-combustion being taken up by slag 26 and carbon-containing material 28.

From offtake 32, the off-gases pass to a suitable treatment installation. This may include a dust separator to remove entrained fines. It also may include a water scrubber for recovery of HF as an aqueous solution, or a dry scrubber in which the off-gases are contacted with particulate alumina to form aluminium fluoride.

Figure 2:
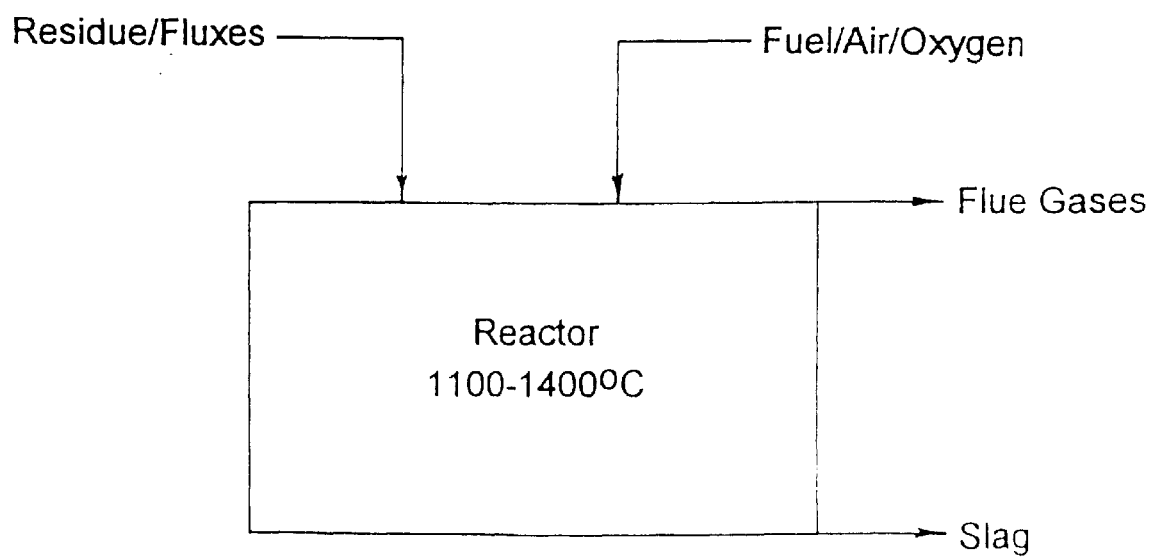
FIG. 2 is a process flowsheet illustrating one form of the process of the present invention.

FIG. 2 is a process flowsheet illustrating the simplicity of the process of the invention. While self-explanatory in the context of description of FIG. 1, FIG. 2 highlights that the process can involve only a single stage smelting operating, requiring only one reactor such as illustrated in FIG. 1.

Figure 3:
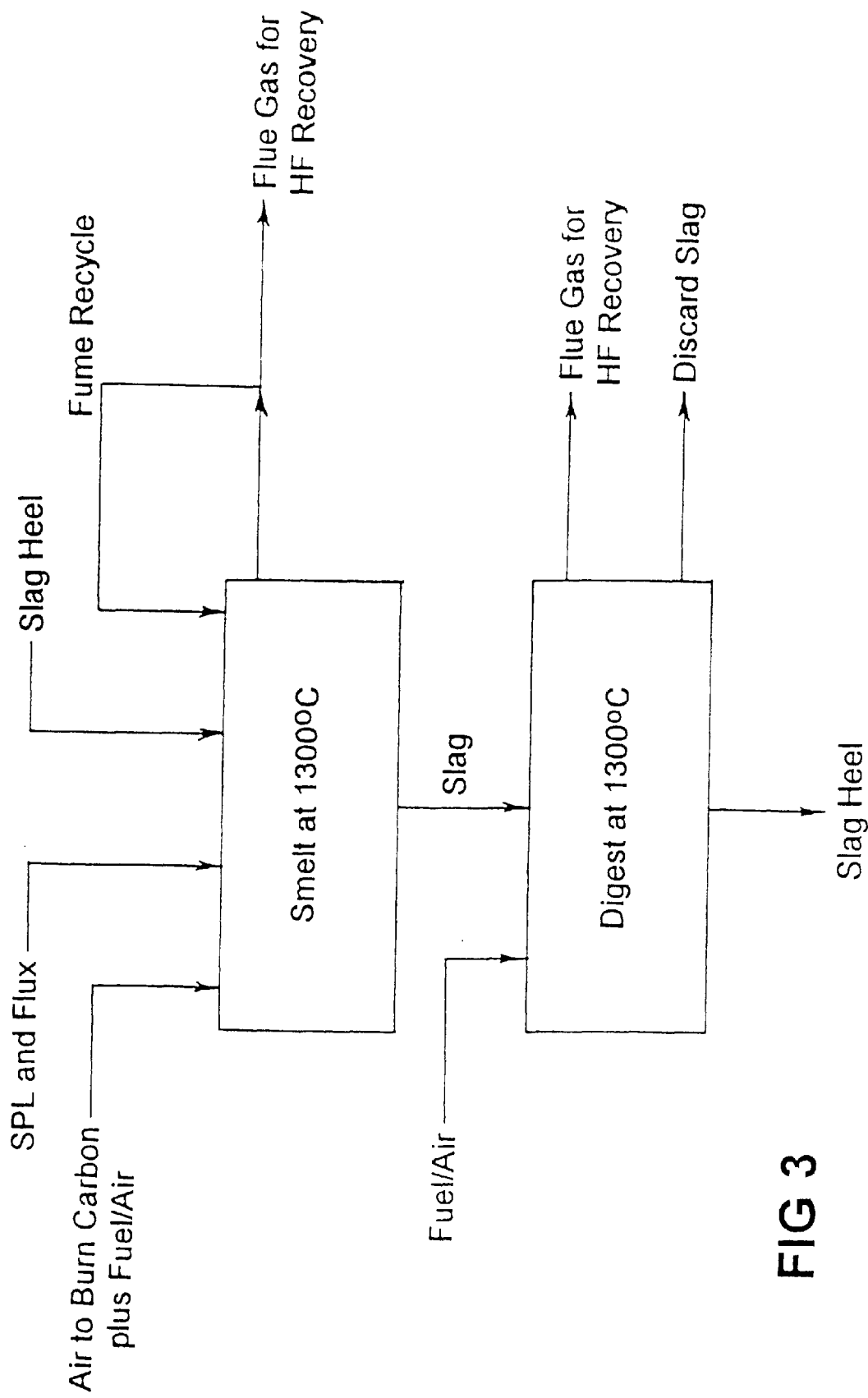
FIG. 3 is a process flowsheet illustrating a second form of the process.

With reference to FIG. 3, there is shown a flowsheet illustrating operation in accordance with a second form of the process of the invention. For this, a single furnace reactor is sufficient, although operation is in a two-stage, batchwise mode. The process of FIG. 3 is illustrated with reference to the smelting of carbon-containing material comprising SPL material. However, as with the process of FIGS. 1 and 2, the process of FIG. 3 is able to be adapted for similar smelting of other carbon-containing materials, such as waste graphite blocks from a nuclear reactor, residue from a vertical retort, graphite material from metallurgical cupellation crucibles or activated carbon.

In the first stage, a slag heel is provided in the reactor. Feed of SPL material and flux is progressively charged, while air to combust the free carbon of the SPL material is injected into the slag by a top-submerged injecting lance. If necessary fuel and, if required, further air is injected. Resultant smelting, preferably at from 1100 to 1400° C., most preferably at about 1300° C., consumes the carbon content of the SPL material, while fluorine is extracted with flue gas. Other contaminants such as $H_2S$ and HCN are substantially fully destroyed by combustion with oxygen so that only extremely small amounts leave with the off-gas. Fluorine typically is extracted as HF vapour which is able to be recovered for reuse. However, some fluorine can report in the flue gas as NaF fume and, where this is the case, the fume preferably is recycled to the first stage operation. This recycling of NaF fume enables increased exposure to the furnace reaction conditions, enabling reaction of the NaF to generate further HF, with the sodium being taken up by the slag.

On completion of the first stage, the feeding of SPL material and flux is terminated. The slag then is subjected to a blow down period at a similar temperature to that used in the first stage, with ongoing top-submerged injection of air and fuel. Combustion of the fuel and residual SPL material is continued, at least until the latter is exhausted and the flue gas is substantially free of HF. Any NaF present in the second stage flue gas can be recycled to the furnace in that stage, as shown for the first stage. After the second stage, there then remains a slag which, after granulation in a stream of water, can be discarded or used as environmentally acceptable land fill low in toxic elements such as fluorine and HCN. A residual heel of slag is retained, for commencement of a further two-stage cycle of operation.

The invention now will be further illustrated by reference to the following specific Examples.

EXAMPLE 1

300 kg of Cut 1 SPL and 200 kg of Cut 2 SPL material together with 320 kg of flux slag were fed over a period of 280 minutes into a liquid bath comprising 100 kg of flux slag containing iron oxide held at temperatures of 1255 to 1300° C. in a top submerged lancing furnace. The mix of feed had been crushed to minus 20 mm sizing and was mixed with 10% water by weight of SPL just prior to entering the feed port in the top of the furnace. The Cut 1, Cut 2 and flux slag had compositions as shown in Table 1.

TABLE 1

ASSAY OF MATERIALS - EXAMPLE 1

| | Fe % | SiO$_2$ % | Al$_2$O$_3$ % | CaO % | MgO % | C % | F % | Na % |
|---|---|---|---|---|---|---|---|---|
| SPL Cut 1 | 3.3 | 14.4 | 26.9 | 2.1 | 1.3 | 10.0 | 6.8 | 19.8 |
| SPL Cut 2 | 3.7 | 10.0 | 29.0 | 3.0 | 1.2 | 2.4 | 7.2 | 21.8 |
| Flux Slag | 21.4 | 16.1 | 6.9 | 32.9 | 3.5 | — | 0.4 | 0.1 |
| Final Slag | 17.8 | 20.5 | 17.8 | 15.7 | 4.8 | — | 0.6 | 9.0 |

The top submerged lance was fired with natural gas at a rate of 40 Nm$^3$/h. Air and oxygen were injected with the natural gas to completely burn the natural gas as well as the carbon in the SPL. The air was enriched with the oxygen for a total of 23% oxygen. The post-combustion air was injected at a rate of 75 Nm$^3$/h above the bath, using a shroud system which forms part of the lance.

During the smelting operation and at the end of the smelting period slag was tapped from the furnace after allowing a digestion period of ten minutes to digest the last of the feed.

The final slag was granulated in water and had an assay as shown above. A leaching test specified by the EPA in Victoria was carried out on the final slag. The solution contained 7.2 mg/l fluoride ion, which was well within the requirements for material for landfill of less than 150 mg/l.

The pilot plant facilities were provided with a hygiene ducting and baghouse system to ensure a safe and clean working environment. The gas handling system from the furnace contained a cooler, baghouse and sodium carbonate scrubbing towers. Environmental monitoring was performed on both the flue gas system and the hygiene scrubbing system, as well as in the working environment. The tests indicated compliance of the plant for the levels in the gas emissions of particulate matter, nitrogen oxides, sulphur trioxide, sulphur dioxide, carbon monoxide, hydrogen fluoride, hydrogen sulphide, phosgene, methane and ammonia. The work place environment had undetectable levels of all pollutants during plant operations. The carbon content in the feed was completely burnt to $CO_2$ in the operations and the tapped slag contained no carbon. Approximately 90% of the fluorine in the SPL feed was removed as HF and collected in the scrubber system. Less than 1% of the weight of SPL was collected as fume and dust in both baghouses. The baghouse fume contained 20.3% F and 22.0% Na, indicating that it contained mostly NaF. This represented 1.5% of the total fluorine in SPL feeds.

EXAMPLE 2

A plant has been designed to process in a top submerged lancing reactor as in FIG. 1, operating at 1300° C., 20,000 tpa of SPL assay shown in Table 2.

TABLE 2

ASSAY OF MATERIALS - EXAMPLE 2

| | Fe % | SiO$_2$ % | Al$_2$O$_3$ % | CaO % | MgO % | C % | F % | Na % |
|---|---|---|---|---|---|---|---|---|
| SPL Cut 1 | 1.6 | 2.1 | 5.0 | — | — | 67.6 | 12.9 | 7.8 |
| SPL Cut 2 | 1.6 | 36.0 | 15.7 | — | — | 5.0 | 17.1 | 10.4 |
| Flux Slag | 21.3 | 16.1 | 16.6 | 33.8 | 4.8 | — | — | 0.1 |
| Final Slag | 14.5 | 24.6 | 12.2 | 21.3 | 9.2 | — | 0.7 | 7.6 |

The plant uses a heel of 974 kg of discard slag as the starting bath for a cycle of smelting SPL Cut 1 and Cut 2 at 2.1 tonne/h and 1.4 tonne/h respectively. The iron oxide containing flux slag is smelted at 2.4 tonne/h while firing the top submerged lance with 100 Nm$^3$/h of natural gas, 960 Nm$^3$/h of combustion air, 13,400 Nm$^3$/h of smelting air and 2,000 Nm$^3$/h of afterburn air. The furnace capacity is reached after 4.15 hours of smelting and feeding of all materials is stopped and firing is changed to provide the heat needed to maintain the temperature at 1300° C. whilst digesting the last of the feed over a period of 15 minutes. Following this the slag is tapped from the furnace into a granulation launder for discard or sale, leaving a heal of slag in the furnace for the bath needed for the next cycle of scrubbing.

The flue gases are cooled and ducted to a scrubbing system to collect the HF in a reuseable form.

As in Example 1 the slag is suitable for use as landfill or for other purposes.

In the preceding description, reference is to substantially complete post-combustion. This is to ensure that evolved contaminants such as HCN are fully combusted to harmless gases. However, it is to be understood that less than complete post-combustion is possible, with full combustion being effected externally of the reactor in a suitable afterburner device, if required.

EXAMPLE 3

A sample of vertical retort residue material, obtained following distillation of zinc from zinc concentrate mixed with coke, was subjected to laboratory scale top-submerged lance smelting. The conditions used were comparable to those described with reference to FIGS. 1 and 2 for SPL material. The composition of the residue was as shown in Table 3.

TABLE 3

RESIDUE ANALYSIS - EXAMPLE 3

| Constituent | |
|---|---|
| Zn | 3.6 wt % |
| Pb | 4.9 wt % |
| Fe | 11.2 wt % |
| $SiO_2$ | 18.3 wt |
| CaO | 4.8 wt % |
| S | 2.2 wt % |
| AS | 0.6 wt % |
| $Al_2O_3$ | 6.1 wt % |
| C | 32.2 wt % |
| Aq | 115 ppm |

For smelting the residue, a start-up bath of reverberatory slag initially was melted and heated to the required operating temperature of 1350° C. The composition of the slag is shown in Table 4.

TABLE 4

SLAG COMPOSITION - EXAMPLE 3

| Constituent | Wt % |
|---|---|
| Fe | 37.1 |
| $Fe_2O_3$ | 4.9 |
| $SiO_2$ | 36.8 |
| CaO | 9.5 |
| $Al_2O_3$ | 3.7 |
| Zn | 0.09 |
| Pb | 0.02 |
| Cu | 0.46 |
| S | 0.97 |

The residue was fed progressively to the molten slag, together with flux. The flux was limestone containing 45.8 wt % CaO and 4.1 wt % $SiO_2$.

While smelting was essentially in accordance with FIG. 2, it was on a laboratory scale in simulating equipment, rather than in a furnace reactor as in FIG. 1. The smelting was conducted in a covered alumino-silicate crucible which was provided with initial and supplemental heating in an induction furnace. Air was injected into the slag bath, using a 1.5 mm internal diameter alumina tube, at a controlled rate simulating top submerged lance smelting. A nitrogen cover gas was injected into the space above the bath, to prevent air ingress. Weighed quantities of residue and flux were added to the crucible at one minute intervals; the overall feed rate equivalent to 5 g/min of residue feed equivalent. The bath temperature was measured by a thermocouple protected by an alumino-silicate sheath and immersed in the bath. The temperature was controlled manually, by adjustment of power to the induction furnace.

The overall smelting parameters, starting with 100 g of slag, and injection of nitrogen into the slag for 5 minutes before the supply of residue and flux, and switching to top-submerged injection of air, are set out in Table 5.

TABLE 5

SMELTING PARAMETERS

| Conditions of Smelting | 75% oxidation |
|---|---|
| Feed | |
| Residue | 200 g |
| Flux | 20 g |
| Injection Rate | |
| Air | 4.77 1/min |
| Temperature | 1350° C. |
| Time | 60 min |

The results of smelting are set out in Table 6.

TABLE 6

SMELTING RESULTS

| Products | Wt %/ppm |
|---|---|
| Final slag (231 g) | |
| Zn | 0.59% |
| Pb | 0.41% |
| S | 0.05% |
| Fe | 46.2% |
| Ag | 20 ppm |
| Fume (10.2 g) | |
| Zn | 20.90% |
| Pb | 42.40% |
| S | 3.70% |
| Fe | 1.60% |
| Ag | 305 ppm |
| Ash (7.2 g) | |
| Zn | 0.82% |
| Pb | 0.52% |
| S | 5.01% |
| Fe | 11.20% |
| Ag | 200 ppm |

The results show that vertical retort residue can be smelted in accordance with the present invention. The smelting enables carbon in the residue to be utilised as a fuel and reductant. Also, recovery of more than 90% of the zinc and lead content, as clean fume, is able to be achieved.

EXAMPLE 4

A range of trials, similar to Example 3, was conducted with vertical retort residue. In these trials, air flow rates varied from 0% to 100% of the carbon content of the residue based on the analysis of Table 3, compared with the 75% oxidation level in Example 3. In a trial with no oxidation and no flux used, but with injection of nitrogen, an incompletely molten product was obtained, leaving large quantities of ash (about 84 g). That trial did not allow adequate mixing and reaction in the bath, and high levels of zinc and lead were left in the ash. In another trial using oxygen injection for oxidation of 25%, with only 75% of the limestone flux level of Example 3, ash weight decreased to 23 g but, again, mixing still was unsatisfactory, as was zinc and lead recovery (there being over 1 wt % of each in the slag).

Trials with oxygen injection for 50 to 90% oxidation produced slag with well below 1.0 wt % zinc and lead. One trial, at 50% oxidation, achieved the lowest levels of zinc and lead in the slag, but, at such levels, a speiss phase was present and, more importantly, a large quantity of ash (58.4 g) was left on the slag. Increasing the oxidation rate to 75%, as in Example 3, reduced the amount of ash to about 10.8 g while maintaining the levels of zinc and lead in the slag around 0.5%. Those levels were maintained in trials operated at oxidation rates of 90%, with ash levels being further suppressed to about 8 g.

Trials aimed at combusting 100% of the carbon content of the residue utilised a first smelting stage and a second reduction stage. The smelting stage was run for 90 minutes, but otherwise was in accordance with Example 3. The reduction stage was for 30 minutes, during which coal as reductant was added at 0.5 g/min. While the level of lead in the resultant slag was well below 1%, the level of zinc was at about 1%. This is not typical of zinc reduction from slag and is believed to be due to preferential reduction of magnetite before zinc fuming can occur, suggesting the need for a longer reduction time. However, use of a gaseous reductant such as natural gas was found to be more efficient than coal and can offset this effect.

Further single stage trials used carbon in the feed material to act as a reductant. This was found to be beneficial and, subject to oxidation rate, enable high recovery of lead and zinc with well below 1% zinc and below 0.5% lead in the slag. In still further trials, increasing the level of flux addition did not effect the removal of zinc and lead from the slag, but it did however further decrease the amount of ash remaining after smelting.

In general, in the further trials of Example 4, and in Example 3, arsenic, antimony and silver were substantially removed from the residue during smelting. In the case of arsenic, usually recovered as fume, its level was reduced from an initial value of 6000 ppm in the residue to 300 ppm in the slag. Removal of arsenic was enhanced if a speiss phase formed. Of the order of 50% recovery of arsenic generally was effected as fume. With use of natural gas as a reductant, and a speiss phase formed, up to 95% recovery of arsenic in the speiss was possible.

Silver was removed to fume from 115 ppm in the residue feed to about 10 to 20 ppm in slag under smelting conditions achieving successful removal of zinc and lead. The inferred recovery of silver to fume (and speiss where applicable) ranged from 80 to 90%.

Fume samples typically contained 25% Zn, 40% Pb, 1% Fe, 0.5% CaO, 2.6% S, 3.5% As, 3.3% C, 1.0% $SiO_2$, 0.2% Cu, 0.1% $Al_2O_3$, 0.25% Sb and 240 ppm Ag. Carbon levels of less than 1% were obtained in some trials.

A speiss phase was produced at 1300° C. with oxidation rates between 50% and 75%. A typical speiss contained 0.13% Zn, 0.34% Pb, 70.3% Fe, 4.75% S and 7.3% Cu. Increasing temperature and/or the percentage oxidation of carbon in the residue decreased the likelihood of speiss formation. Use of natural gas feed as reductant during smelting produced a speiss phase; the speiss tending to be lower in zinc and lead but also containing about 4% As.

The amount of ash formed was dependant on smelting temperature, oxidation rate and the flux rate. An increase in each of these parameters decreased the amount of ash. The ash consisted of unreacted residue feed material. In general, when the ash was completely or substantially completely removed, the zinc in slag was greater than 0.5% and the lead level also was higher. A typical analysis range for the ash is set out in Table 7.

TABLE 7

ASH ANALYSIS

| Constituent | Low | High |
| --- | --- | --- |
| Fe | 4.60% | 15.60% |
| C | 0.66% | 70.00% |
| $SiO_2$ | 2.36% | 35.00% |
| CaO | 1.10% | 14.80% |
| $Al_2O_3$ | 3.70% | 7.62% |
| Zn | 0.19% | 1.65% |
| Pb | 0.06% | 2.06% |
| Cu | 0.38% | 6.45% |
| S | 1.80% | 12.10% |
| As | 0.12% | 0.90% |
| Aq | 20 ppm | 200 ppm |
| Sb | 100 ppm | 1000 ppm |

With reference to Examples 1 to 4 and the preceding description, it will be appreciated from Example 4, in particular, that the present invention can be operated in the presence of a metal phase. Indeed, it is to be understood that the smelting operation of the present invention can form part of a process for the recovery of metal values from a suitable ore, concentrate or the like, or for the recovery of metal values from an intermediate or discard material such as a slag. That is, the carbon-containing material to be smelted by the process of the present invention can be used, in effect, as a fuel and/or reductant enabling recovery of metal values from another material or product. In general, this use of the invention will not be practical, due to limited availability of the respective materials at a common site. Also, of course, there is a need for a suitable degree of compatibility between the carbon-containing material, and a metal value containing material or product. Thus, while it can be acceptable to smelt a vertical retort residue, using a zinc containing slag, for recovery of zinc fume from each material, it clearly would be undesirable to use a radioactive carbon-containing material in such context. However, notwithstanding such ability to use the carbon-containing material to aid in recovery of metal values from another material, it generally is appropriate for the present invention to be used solely for smelting the carbon-containing material alone.

Finally, it is to be understood that various alterations, modifications and/or additions may be introduced into the constructions and arrangements of parts previously described without departing from the spirit or ambit of the invention.

We claim:

1. A process for treating carbon-containing material contaminated with toxic elements, in which the carbon is present essentially as free or elemental carbon in a solid, particulate or lump form wherein the process comprises the steps of:

(a) charging the carbon-containing material to a top-submerged lancing reactor and smelting the carbon-containing material in said reactor in the presence of a fluid slag, (b) directly injecting an oxygen-containing gas into the slag during the smelting, by a top-submerged lance, to combust substantially all of the carbon content of the carbon-containing material, and (c) discharging volatilizable toxic elements as fume in reactor off-gas and substantially fully incorporating non-volatilizable toxic elements in the slag;

wherein the slag is a silica slag containing iron oxide with the iron oxide present in the slag at a level such that the iron oxide acts as an oxygen carrier enhancing combustion of the content of the carbon-containing material by the reactions:

  (1)

  (2)

$2FeO_{(slag)} + \frac{1}{2}O_2 = 2FeO_{1.5(slag)}$ (1)

$2FeO_{1.5(slag)} + C = 2FeO_{(slag)} + CO$ (2)

and maintaining these reactions by turbulence in the slag generated by the top-submerged injection of the oxygen-containing gas.

2. A process according to claim 1 wherein a suitable flux material is added to the carbon-containing material to form the fluid slag.

3. A process for treating carbon-containing material contaminated with toxic elements, in which the carbon is present essentially as free or elemental carbon in a solid, particulate or lump form; wherein the process comprises the steps of:

(a) charging the carbon-containing material to a top-submerged lancing reactor and smelting the carbon-containing material in said reactor in the presence of a fluid slag, (b) directly injecting an oxygen-containing gas into the slag during the smelting, by a top-submerged lance, to combust substantially all of the carbon content of the carbon-containing material, and (c) discharging volatilizable toxic elements as fume in reactor off-gas and substantially fully incorporating non-volatilizable toxic elements in the slag;

wherein the process is conducted in two stages in which top-submerged lances are operable in at least two zones whereby there is at least one first zone to which the carbon-containing material is fed and in which its carbon-content is combusted in a first stage by the top-submerged injection of oxygen-containing gas and at least one second zone to which there is no feed of the carbon-containing material and in which mixing and flushing of slag from the first zone is effected in a second stage by the top submerged injection of oxygen-containing gas.

4. A process for treating carbon-containing material contaminated with toxic elements, in which the carbon is present essentially as free or elemental carbon in a solid, particulate or lump form; wherein the process comprises the steps of:

(a) charging the carbon-containing material to a top-submerged lancing reactor and smelting the carbon-containing material in said reactor in the presence of a fluid slag, (b) directly injecting an oxygen-containing gas into the slag during the smelting, by a top-submerged lance, to combust substantially all of the carbon content of the carbon-containing material, and (c) discharging volatilizable toxic elements as fume in reactor off-gas and substantially fully incorporating non-volatilizable toxic elements in the slag;

wherein the process is operated in a two-cycle batchwise manner wherein the carbon-containing material is combusted by the top-submerged injection of the oxygen-containing as, during a first stage, and the top-submerged injection of the oxygen-containing as provides flushing of the slag during a second stage in which there is substantially no feeding of the carbon-containing material.

5. A process according to claim 1, wherein the carbon-containing material includes spent pot liner (SPL).

6. A process according to claim 1, wherein the carbon-containing material is vertical retort residue.

7. A process according to claim 1, wherein the carbon-containing material comprises waste graphite from a nuclear reactor.

8. A process according to claim 1, wherein the carbon content of the combustion of the carbon-containing material provides all of the heat requirements of the process.

9. A process according to claim 1, wherein additional fuel is added to the reactor to provide for the heat requirements of the process.

10. A process according to claim 1, wherein the carbon-containing materials includes fluorine-containing toxic material and said fluorine is liberated from said toxic material through reactions including a hydrogen-containing compound which is added to said carbon-containing in said reactor.

11. A process according to claim 1, wherein the carbon-containing material includes toxic elements which are oxidised within the reactor to produce harmless products.

12. A process according to claim 1, wherein said lance additionally is adapted to discharge oxygen-containing gas into a reactor space above the slag to provide oxygen for post-combustion of gases produced by the smelting of the carbon-containing material.

13. A process for treating carbon-containing material contaminated with toxic elements, in which the carbon is present essentially as free or elemental carbon in a solid, particulate or lump form; wherein the process comprises the steps of:

(a) charging the carbon-containing material to a top-submerged lancing reactor and smelting the carbon-containing material in said reactor in the presence of a fluid slag, (b) directly injecting an oxygen-containing gas into the slag during the smelting, by a top-submerged lance, to combust substantially all of the carbon content of the carbon-containing material, and (c) discharging volatilizable toxic elements as fume in reactor off-gas and substantially fully incorporating non-volatilizable toxic elements in the slag; wherein the process is conducted at a temperature of from 1100° C. to 1400° C. and the reactor is water-cooled to form a lining of solidified slag, said lining protecting refractory containment material of the reactor, at least in regions of the containment material prone to wear, from dissolution in the fluid slag.

14. A process according to claim 1, wherein the process is conducted at a temperature from 1100° C. to 1400° C.

15. A process according to claim 14, wherein the reactor is water-cooled to form a lining of solidified slag, said lining protecting refractory containment material of the reactor, at least in regions of the containment material prone to wear, from dissolution in the fluid slag.

16. A process according to claim 3, wherein the process is conducted at a temperature from 1100° C. to 1400° C.

17. A process according to claim 4, wherein the process is conducted at a temperature from 1100° C. to 1400° C.

* * * * *